US011870162B2

(12) United States Patent
Davis et al.

(10) Patent No.: US 11,870,162 B2
(45) Date of Patent: Jan. 9, 2024

(54) HIGH GAIN TIGHTLY COUPLED DIPOLE ANTENNA ARRAY

(71) Applicant: The Boeing Company, Chicago, IL (US)

(72) Inventors: Grant E. Davis, Seattle, WA (US); Matthew G. Rivett, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/495,192

(22) Filed: Oct. 6, 2021

(65) Prior Publication Data

US 2022/0239001 A1 Jul. 28, 2022

Related U.S. Application Data

(60) Provisional application No. 63/140,412, filed on Jan. 22, 2021.

(51) Int. Cl.
*H01Q 9/04* (2006.01)
*H01Q 19/10* (2006.01)
(Continued)

(52) U.S. Cl.
CPC ........... *H01Q 9/0407* (2013.01); *H01Q 1/287* (2013.01); *H01Q 19/10* (2013.01); *H01Q 21/062* (2013.01); *H01Q 21/08* (2013.01)

(58) Field of Classification Search
CPC .. H01Q 1/38; H01Q 1/48; H01Q 3/00; H01Q 3/2611; H01Q 3/2617; H01Q 3/2641; H01Q 3/44; H01Q 3/446; H01Q 5/378; H01Q 5/385; H01Q 5/392; H01Q 5/48; H01Q 5/49; H01Q 9/0407; H01Q 9/0414;
(Continued)

(56) References Cited

U.S. PATENT DOCUMENTS 4,186,400 A * 1/1980 Cermignani ........... H01Q 1/523 342/372
4,290,071 A * 9/1981 Fenwick .................. H01Q 5/49 343/834

(Continued)

FOREIGN PATENT DOCUMENTS

CN 1881685 A * 12/2006
WO WO-2022128079 A1 * 6/2022

OTHER PUBLICATIONS

Extended European Search Report dated Jun. 15, 2022 for European Patent Application No. 22152389.7.

(Continued)

*Primary Examiner* — Ab Salam Alkassim, Jr.
*Assistant Examiner* — Leah Rosenberg
(74) *Attorney, Agent, or Firm* — GATES & COOPER LLP

(57) ABSTRACT

An antenna system including an array of conductors connected to a feed line, wherein the array is configured to (1) emit electromagnetic radiation in response to an input signal being input to the array through the feed line or (2) output an output signal to the feed line in response to electromagnetic radiation being received on the array; and a director disposed in front of the array, wherein the director has a first reactive load having a complex impedance that is tailored to increase a directivity of the antenna system by reactively loading the conductors.

20 Claims, 16 Drawing Sheets

(51) Int. Cl.
*H01Q 1/28* (2006.01)
*H01Q 21/06* (2006.01)
*H01Q 21/08* (2006.01)

(58) Field of Classification Search
CPC .... H01Q 9/0442; H01Q 9/065; H01Q 13/206; H01Q 15/006; H01Q 19/005; H01Q 19/10; H01Q 19/30; H01Q 21/0075; H01Q 21/06; H01Q 21/061; H01Q 21/062; H01Q 21/065; H01Q 21/08; H01Q 21/29; H01Q 21/293
See application file for complete search history.

(56) References Cited

U.S. PATENT DOCUMENTS 4,336,543 A 6/1982 Ganz et al.
4,749,997 A * 6/1988 Canonico ........... H01Q 21/0025 343/705
5,012,256 A * 4/1991 Maddocks ........... H01Q 21/062 342/368
8,378,921 B2 2/2013 Delfeld et al.
2011/0080325 A1* 4/2011 Livneh ................... H01Q 3/247 343/702
2013/0120216 A1* 5/2013 Delfeld .............. H01Q 21/0006 343/858
2014/0118191 A1 5/2014 Smith et al.
2019/0214726 A1* 7/2019 Yamagajo .............. H01Q 21/12
2022/0407233 A1* 12/2022 Woo ......................... H04B 1/40

OTHER PUBLICATIONS

Wang, Z., et al., "Design of a Wideband Horizontally Polarized Omnidirectional Antenna With Mutual Coupling Method", IEEE Transactions on Antennas and Propagation, Jul. 2015, pp. 3311-3316, vol. 63, No. 7, XP011662496.
Petit, L., et al., "MEMS-Switched Parasitic-Antenna Array for Radiation Pattern Diversity", IEEE Transactions on Antennas and Propagation, Sep. 2006, pp. 2624-2631, vol. 54, No. 9, XP001545386.
Zhang, Y., et al., "Design and analysis of optically controlled pattern reconfigurable planar Yagi-Uda antenna", IET Microwaves, Antennas & Propagation, the Institution of Engineering and Technology, United Kingdom, Jul. 2018, pp. 2053-2059, vol. 12, No. 13, XP006107507.

* cited by examiner

HIGH GAIN TIGHTLY COUPLED DIPOLE ANTENNA ARRAY

CROSS REFERENCE TO RELATED APPLICATIONS

This application claims the benefit under 35 U.S.C. Section 119(e) of commonly-assigned U.S. Provisional Patent Application No. 63/140,412, filed Jan. 22, 2021, by Grant E. Davis and Matthew G. Rivett, entitled "HIGH GAIN TIGHTLY COUPLED DIPOLE ANTENNA ARRAY,", which application is incorporated by reference herein.

BACKGROUND

1. Field

The present disclosure relates to antenna systems and methods of making the same.

2. Description of the Related Art

Tightly Coupled Dipole Antenna Arrays (TCDAs) comprise an array of dipoles that provide broadband and wide angle performance for transmitter and receiver applications. For some applications, however, it is desirable to have gain with increased directivity over a narrower angle. The present disclosure satisfies this need.

SUMMARY

Antenna systems having increased directivity are disclosed herein. Illustrative, non-exclusive examples of inventive subject matter according to the present disclosure are described in the following enumerated paragraphs:

A1. An antenna system, comprising:

an array of conductors coupled to a feed line, wherein the array is configured to:

emit electromagnetic radiation in response to an input signal being input to the array through the feed line; or output an output signal to the feed line in response to electromagnetic radiation being received on the array; and a director disposed in front of the array, wherein the director has a first reactive load having a first complex impedance that is tailored to increase a directivity of the antenna system by reactively loading the conductors.

A2. The antenna system of paragraph A1, further comprising a reflector disposed behind the array, wherein the reflector is configured to cause a reflection of a portion of the electromagnetic radiation, received on the reflector and comprising received electromagnetic radiation, toward the director.

A3. The antenna system of paragraph A2, wherein:

the reflector comprises a second reactive load; and the second reactive load has a second complex impedance that tailors the reflection of the received electromagnetic radiation toward the director.

A4 The antenna system of paragraph A3, wherein:

the reflector comprises a printed circuit board;

the printed circuit board comprises a conductive track; and the conductive track comprises at least one of a thickness or meander varying as a function of position along a length of the reflector so as to tailor the second complex impedance.

A5. The antenna system of any of the paragraphs A1-A4, wherein:

the director comprises a printed circuit board;

the printed circuit board comprises circuitry; and the circuitry has one or more reactive impedances that form the first reactive load.

A6. The antenna system of paragraph A5, wherein:

the circuitry comprises circuit elements configured to control a phase of the electromagnetic radiation at different positions along a length of the array so as to increase the directivity by tailoring at least one of a destructive interference or constructive interference of the electromagnetic radiation at the different positions.

A7. The antenna system of any of paragraphs A5-A6, wherein the one or more reactive impedances comprises a capacitive reactance and an inductive reactance.

A8. The antenna system of any of the paragraphs A1-A7, wherein the first reactive load comprises an array of circuit elements, and wherein each of the circuit elements comprises:

a first capacitor; and a second capacitor in parallel with an inductor;

wherein the first capacitor is in series with the combination of the second capacitor and the inductor.

A9. The antenna system of any of the paragraphs A1-A8, wherein:

the conductors are periodically positioned along the array with a period P; and the first reactive load comprises the array of circuit elements positioned along a length of the director with the period P.

A10. The antenna system of any of the paragraphs A1-A9, further comprising:

a first microstrip comprising the array, wherein the first microstrip further includes:

the conductors;

a conductive backplane;

a first dielectric disposed between the conductors and the conductive backplane; and a plurality of loads, wherein each of the loads connects one of the conductors to an adjacent one of the conductors; and a second microstrip comprising the director, wherein:

the second microstrip further comprises the first reactive load;

the first reactive load comprises a plurality of conductive components separated by one or more dielectric layers; and the plurality of conductive components comprise at least one of a capacitive pad or a wire having an inductance.

A11. The antenna system of paragraph A10, further comprising:

a third microstrip comprising the reflector positioned behind the array, wherein the third microstrip comprises a second reactive load including a wire having at least one of a varying thickness or a meander varying an inductance of the wire along a length of the third microstrip.

A12. The antenna system of paragraph A11, wherein the first microstrip, the second microstrip, and the third microstrip are parallel, coplanar, and have the same length.

A13. The antenna system of any of the paragraphs A1-A12, wherein:

a distance between the array and the director is within 10% of $\lambda/4$;

a distance between the array and the reflector is within 10% of λ/8; and

λ is the longest wavelength of the radiation.

A14. The antenna system of any of the paragraphs A3-A13, wherein the first reactive load and the second reactive load are tailored as a function of:

a frequency of the electromagnetic radiation in range between 10 MHz and 10 GHz; and the directivity of the antenna.

A15. The antenna system of any of the paragraphs A1-A14, wherein the directivity comprises the electromagnetic radiation converging to or from a sidewall of the array facing the director.

A16. The antenna system of any of the paragraphs A1-A15, wherein the director is configured so that the directivity comprises the electromagnetic radiation focused in an elevation direction from or to a horizon.

A17. The antenna system of any of the paragraphs A1-A16, wherein the array comprises a tightly coupled dipole array (TCDA) or a multi-tap antenna.

A18. The antenna system of paragraph A17, wherein:

the conductors each have a length within 10% of λ/10;

the conductors are separated by a distance within 10% of λ/100; and

λ is the longest wavelength of the electromagnetic radiation.

A19. The antenna of paragraph A17 or A18, wherein:

the conductors are capacitively coupled or coupled by a near field interaction of an electric field, so that the electric field generated by the electromagnetic radiation at one of the conductors and experienced at a next adjacent one of the conductors has:

a near-field amplitude proportional to $1/d^2$; and a reactive near field amplitude proportional to $1/d^3$, where d is a distance separating the one of the conductors from the next adjacent one of the conductors.

A20. The antenna system of any of the paragraphs A1-A19, further comprising an aircraft structure, wherein:

the aircraft structure comprises or is attached to a reflector disposed behind the array;

the reflector is configured to cause a reflection of a portion of the electromagnetic radiation, received on the reflector and comprising received electromagnetic radiation, toward the director; and the aircraft structure further comprises a skin, a wing spar, a bulkhead, or a leading edge of a wing.

A21. An aircraft comprising the antenna system of any of the paragraphs A1-A20.

A22. A method of making an antenna system, the method comprising:

obtaining a multi-tap antenna comprising an array of conductors and a plurality of loads connecting the array of conductors;

coupling a feed line to the array of conductors so that the multi-tap antenna is configured to:

emit electromagnetic radiation in response to an input signal being input to the multi-tap antenna through the feed line; or output an output signal to the feed line in response to electromagnetic radiation being received on the multi-tap antenna;

positioning a director in front of the multi-tap antenna, wherein the director has a director reactance that increases a directivity of the antenna system; and positioning a reflector behind the multi-tap antenna, wherein the reflector has a reflector reactance that causes reflection of the radiation toward the director.

A23. The method of paragraph A22, further comprising:

varying the reflector reactance as a function of position along a length of the reflector; and varying the director reactance along a length of the director, thereby controlling a phase of the electromagnetic radiation at different positions along the length of the director so that at least one of a destructive interference or constructive interference of the electromagnetic radiation is tailored at the different positions.

A24. A method of using an antenna system, the method comprising:

receiving or transmitting radiation using a tightly coupled dipole antenna array (TCDA); and increasing a directivity of the antenna system using a director positioned in front of the TCDA and a reflector positioned behind the TCDA.

A25. The method of paragraph A24, wherein the directivity is toward a horizon or waterline.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes an antenna system comprising an antenna (e.g., a fed array) that is reactively loaded so as to control the directivity of the electromagnetic radiation emitted from and/or received on, the antenna. The reactive loading comprises at least one of an inductive load or a capacitive load comprising one or more parallel circuit elements electromagnetically coupled to the antenna. In some examples, the circuit elements comprise reactive loads having complex impedances tailored to vary the phase of the electric fields or currents experienced on each of the elements in the fed array, so that the sum of the collective electric fields, resulting from destructive and/or constructive interference, is an electric field pattern having the desired directivity (with electric field canceled in undesired directions).

Example Antenna System

Figure 1A:
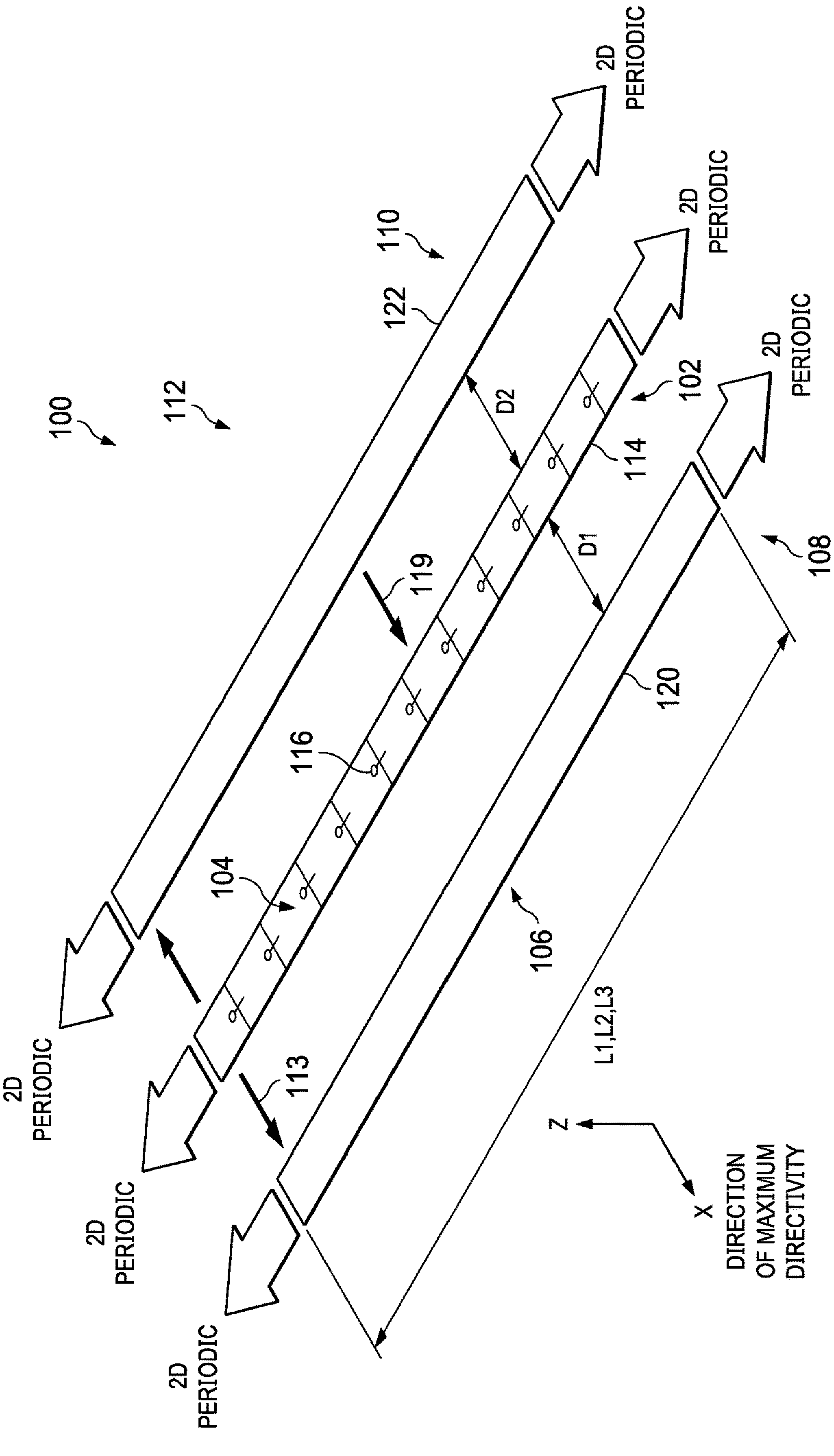
FIG. 1A is a schematic of an example antenna system including a TCDA coupled to a director and a reflector.
Figure 1B:
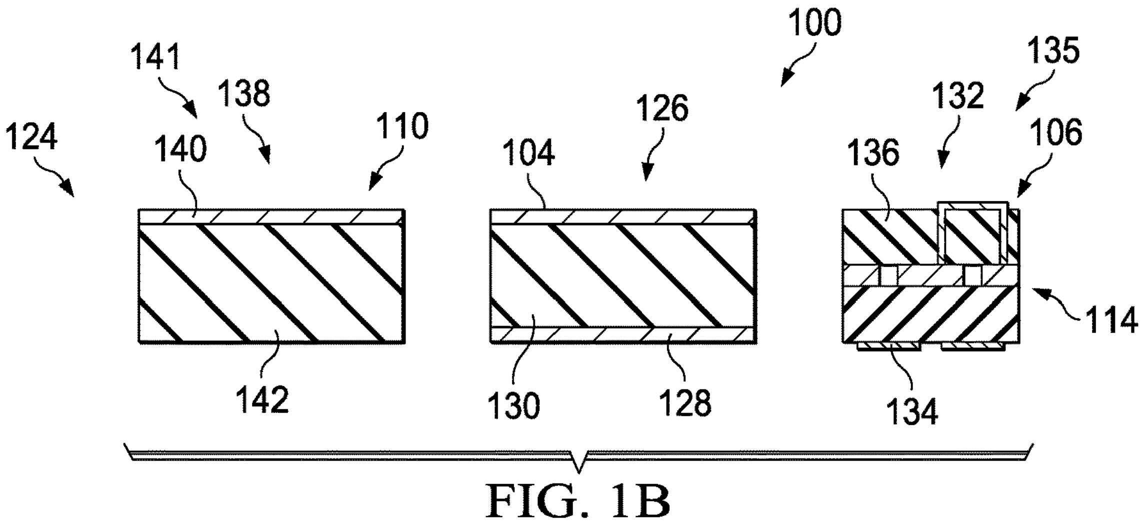
FIG. 1B is a schematic of an example antenna system including a TCDA coupled to a director and a reflector, wherein the TCDA, the director, and the reflector comprise microstrips.

FIGS. 1A-1B illustrate an example antenna system 100 comprising an array 102 of conductors 104 positioned along a length L1 of the array 102. The antenna system 100 further includes a first reactive element (e.g., a director 106) positioned on a first side 108 of the array 102 and a second reactive element (e.g., a reflector 110) positioned on a second side 112 of the array 102, so that the array 102 is between the director 106 and the reflector HO. In the example shown, the director 106 and the reflector HO each comprise reactive components that reactively load the array 102 so that the resulting directivity is an electromagnetic field pattern having maximum directivity along the x direction and electromagnetic radiation 113 is directed from or to a sidewall 114 (a "knife-edge") of the array 102. In the example shown, the conductors 104 are connected by loads 116 and the conductors 104 are disposed along a line to form the array 102 comprising a linear array. In some examples, the array 102 is designed to operate at a single frequency or a narrow range of frequencies of the electromagnetic radiation 113.

In one or more examples, the director 106 comprises a combination of inductive and capacitive loads controlling the phase of the electric fields at each of the conductors 104 in the array 102, whereas the reflector 110 mainly comprises an inductive load tailored so that the reflector reflects 119 the electromagnetic radiation 113 toward the array 102 or the director 106. In some examples, the director 106 comprises a capacitive strip 120 comprising a capacitive load including a first rectangular metal layer on a first dielectric and having its length L2 extending the length L1 of the array 102, the reflector comprises an inductive strip 122 comprising an inductive load including a second rectangular metal layer on a second dielectric and having its length L3 extending the length L1 of the array 102, and the reflector 110 and director 106 both have their lengths L3, L2 longer than their width.

In one or more examples, the distance D1 between the director 106 and the array 102 and the distance D2 between the reflector 110 and the array 102 are also tailored to control the directivity and the reactive impedance of the reactive load. Example distances include, but are not limited to, D1 within 10% of λ/4 and D2 within 10% of λ/8 (wherein λ is the longest wavelength of the electromagnetic radiation 113). In one or more examples, D2 is selected so that the reflector HO comprises an inductive load, and D1 is selected so that the director 106 comprises a capacitive load.

FIG. 1B illustrates an example antenna system 100 implemented using a printed circuit board 124 comprising microstrips having the sidewall 114. The array 102 comprises a first microstrip 126 comprising the conductors 104, a conductive backplane 128, and a first dielectric 130 between the conductors 104 and the conductive backplane 128. The director 106 comprises a second microstrip 132 including one or more first components 134 combined with a second dielectric 136 to form a director reactance (comprising a first reactive load 135 or first reactive component) varying as a function of position along the length L2 of the director 106. The reflector HO comprises a third microstrip 138 including one or more second components 140 combined with a third dielectric 142 to form the reflector reactance (comprising a second reactive load 141 or second reactive component) varying as a function of position along the length L3 of the reflector 110. In various examples, the director reactance and reflector reactance control a phase of the electromagnetic field or current experienced at the different conductors 104 in the array 102 so as to tailor at least one of a destructive interference or constructive interference of the electromagnetic field or current experienced at each of the conductors 104. In one or more examples, when the array 102 of conductors 104 are reactively loaded over the conductive backplane 128 and the reactive loading makes the additional parasitic elements in the director 106 or the reflector 110 appear either shorter (capacitive) or longer (inductive), thereby tuning the directivity.

In various examples, the array 102, the director 106, and the reflector 110 are formed on the same substrate or printed circuit board 124, or they may be formed on different substrates or printed circuit boards 124.

Figure 1C:
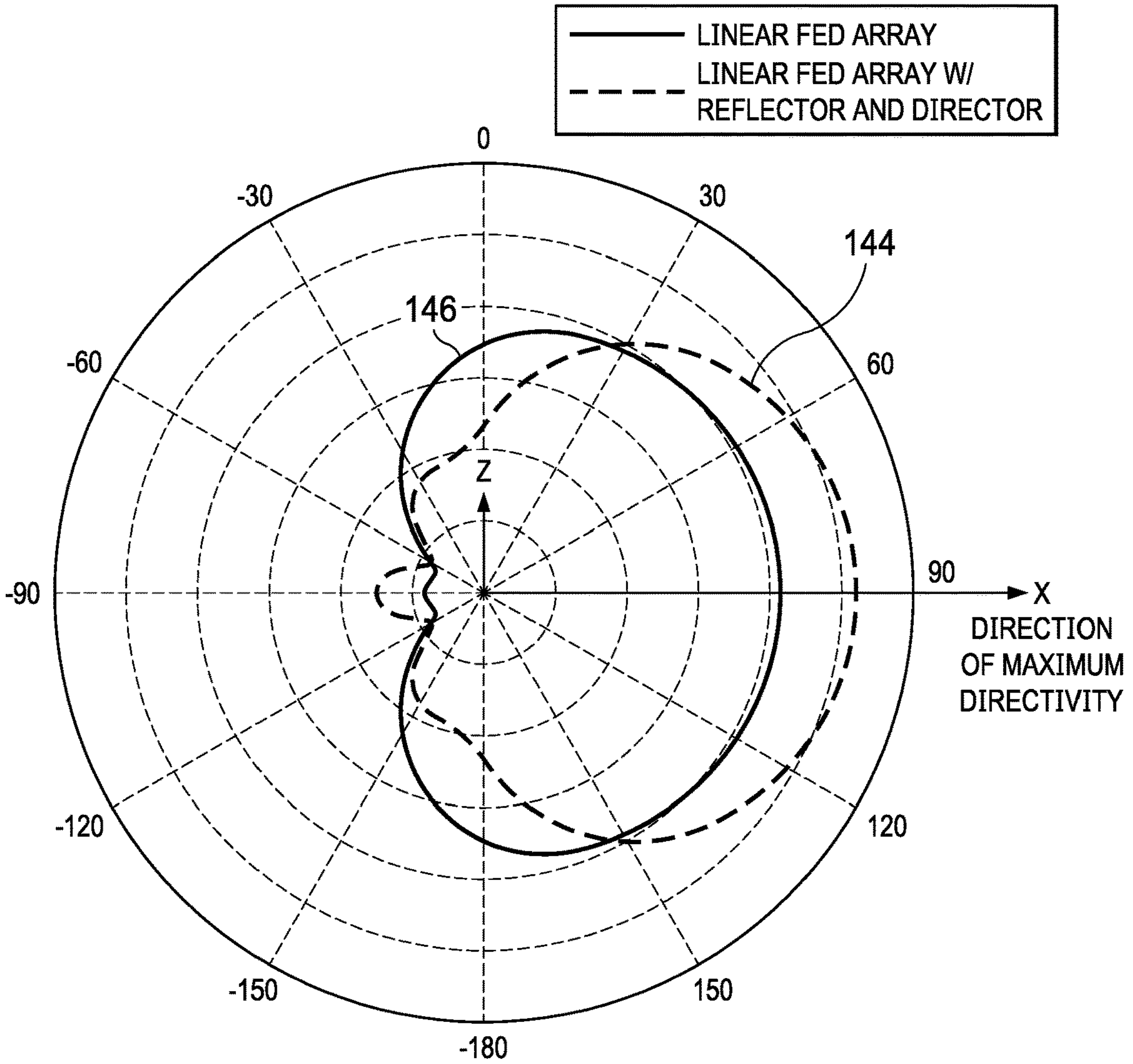
FIG. 1C is a graph comparing the directivity of the antenna system of FIG. 1A with the directivity of an antenna system without the reflector and the director.

FIG. 1C illustrates an example directivity 144 achieved using the antenna system 100 of FIG. 1A as compared to the directivity 146 without the director 106 and the reflector 110. In some examples, the directivity 144 is selected to focus the electromagnetic radiation along an elevation (theta) direction (rather than the azimuth), so that the electromagnetic radiation converges or focuses to or from a horizon.

Although FIG. 1A-1B illustrate the array 102 comprising a linear array of conductors 104, other configurations (e.g., non-linear configurations) of the conductors 104 are also possible. Examples of the array 102 of conductors 104 include, but are not limited to, a fed array, a TCDA wherein the conductors 104 each comprise dipole elements, a phased array (wherein one or more of the conductors 104 in the array 102 are driven and the different conductors 104 in the array 102 experience electric fields or current with different phases), or a multi-tap antenna, as described in the next section.

Example Array

Figure 2:
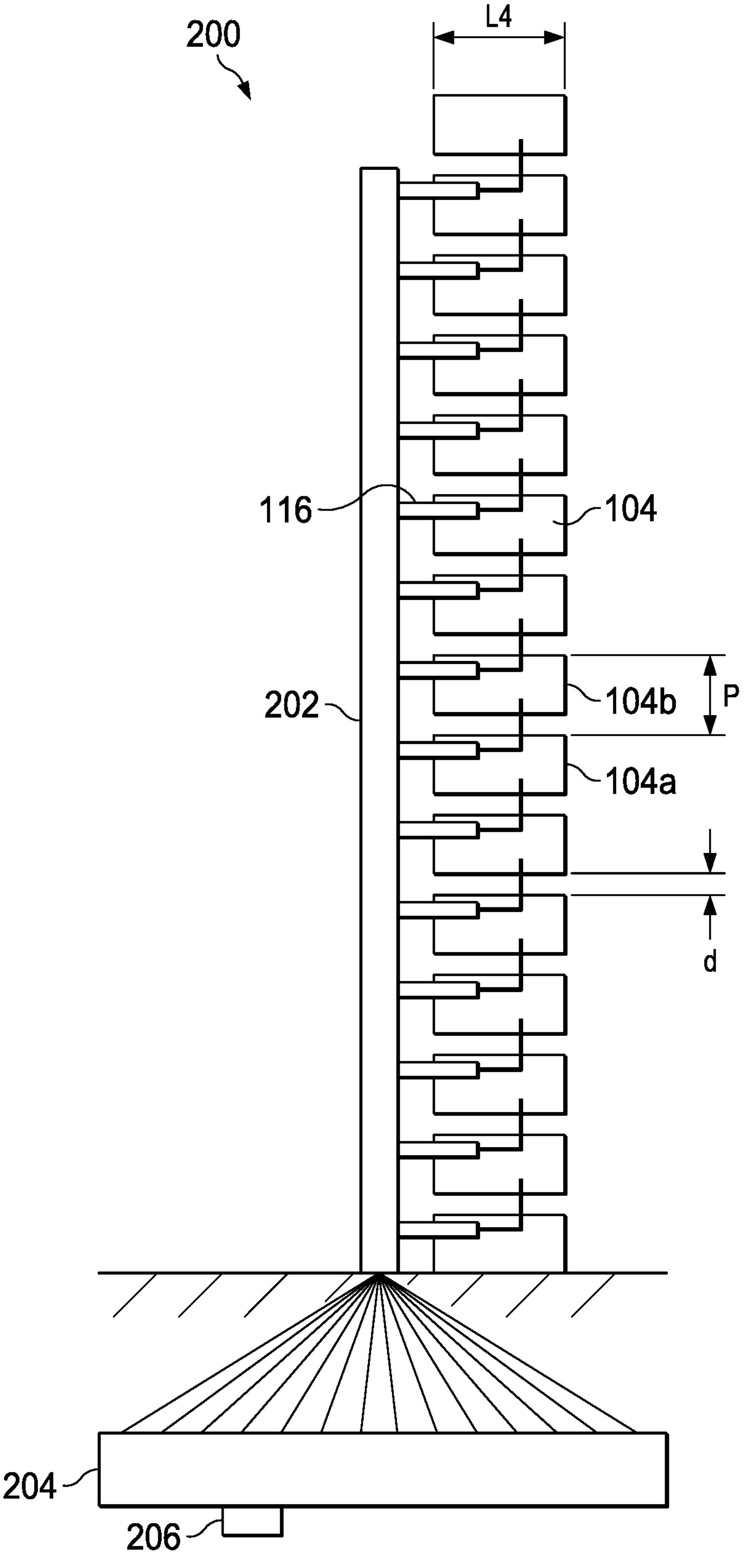
FIG. 2 illustrates an example TCDA comprising a multi-tap antenna.

FIG. 2 illustrates an example array comprising a multi-tap antenna 200 comprising a plurality of loads 116 (e.g., transmission lines) connecting an array of conductors 104 and a feed line 202 connected to the conductors 104. The multi-tap antenna 200 is configured to:

(1) emit electromagnetic radiation in response to an input signal being input to the multi-tap antenna 200 through the feed line 202; or (2) output an output signal to the feed line 202 in response to electromagnetic radiation being received on the multi-tap antenna 200.

FIG. 2 illustrates the array of conductors 104 are dipole elements capacitively coupled or coupled by a near field interaction of an electric held, so that the electric field generated by the electromagnetic radiation at one 104*a* of the conductors 104 and experienced at a next adjacent one 104*b* of the conductors 104 has:

(1) a near-field amplitude proportional to $1/d^2$; and (2) a reactive near field amplitude proportional to $1/d^3$, where d is a distance separating the one of the conductors 104*a* from the next adjacent one 104*b* of the conductors.

Example dimensions include, but are not limited to, each of the conductors 104 comprising a patch having a patch length L4 within 10% of λ/10 and the conductors 104 separated by a distance d within 10% of λ/100 (wherein λ is the longest wavelength of the electromagnetic radiation).

FIG. 2 further illustrates a module 204 connected to a port 206. In one receiver implementation, the loads 116 tap or receive energy or power from signals generated by the conductors 104 when exposed to the electromagnetic radiation, the module 204 comprises a combiner combining the power received by the loads 116, and the port 206 comprises an output port receiving the power. In one receiver embodiment, the loads 116 each have an impedance that is equal to a desired impedance for the output port. In one transmitter embodiment, the module 204 comprises a splitter splitting a signal received on the port 206 which includes an input port, so as to distribute the input signal transmitted to each of the conductors 104. In this manner, power received by or transmitted to the loads 116 is captured or used in a manner that provides improved gain for the multi-tap antenna 200.

The use of the loads 116 (comprising taps) with the conductors 104 broadens the bandwidth of the TCDA comprising the multi-tap antenna 200. In one or more examples, the loads 116 comprise resistive elements and/or capacitive elements and increase the bandwidth at which the antenna operates by introducing loss that destroys the resonant characteristics of the multi-tap antenna 200, lowering the efficiency (or gain) of the multi-tap antenna 200.

Example Director and Reflector Design

In some examples, the reactive loading provided by the director and/or the reflector is determined empirically by varying the dimensions, circuit design (including impedance), and spacing of the director and reflector and measuring the impact of the varying on the directivity. In other examples, the reactive loading is determined using electromagnetic simulation and modeling software.

Figure 3A:
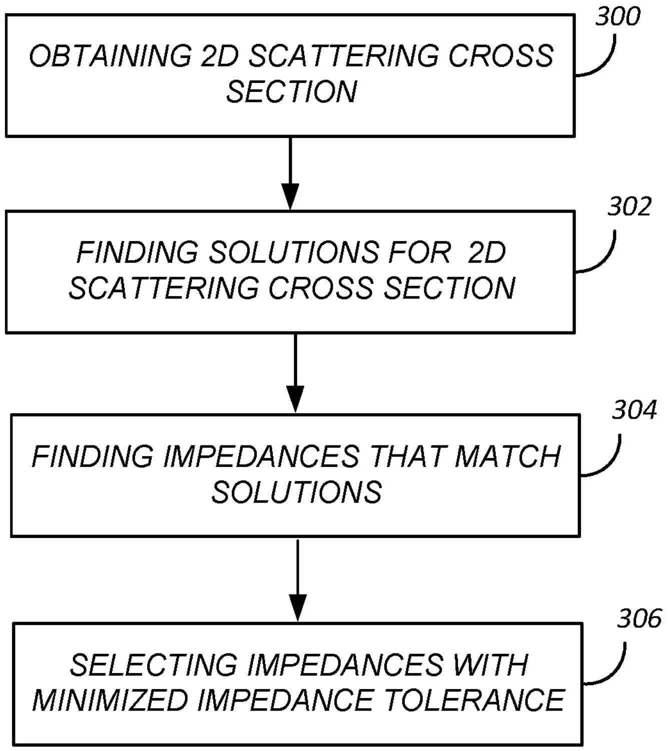
FIG. 3A is a flowchart illustrating an example method of designing a director or reflector.

FIG. 3A is a flowchart illustrating a method of designing the director reactance and reflector reactance (referring also to elements of FIGS. 1A-1C and FIG. 2).

Block 300 represents obtaining an expression for a two dimensional (2D) scattering cross section (e.g., radar cross section (RCS)) of the director 106 or reflector 110, comprising an echo width in units of decibels relative to a knife edge (sidewall 114 of a flat strip), as a function of surface impedance of the director 106 or reflector 110. In one or more examples, the 2D RCS of a single unit cell of the director 106 or reflector 110 is given by:

$$2D\ RCS = E_s = \frac{2\chi}{\chi\alpha + Z_s} \tag{1}$$

where $$\alpha = \left(1 - \frac{2i}{\pi}\ln\left(\frac{\tau}{4}\right)\right)\ \tau = \frac{k_0\eta_0 w}{4},\ \chi = \frac{k_0\gamma w}{2},$$

and γ=1.781, and $Z_s$ is the surface impedance of the single unit cell, $k_0$ is the frequency dependent wavevector of the electromagnetic radiation, and $\gamma_0$ is the resistive impedance.

Block 302 represents finding solutions of $E_s$ that have the desired directivity of the antenna system comprising the director 106, the reflector 110, and the array 102. In one or more examples, $E_s$ is determined using finite element modeling of the director 106 and/or the reflector 110.

Block 304 represents finding the one or more surface impedances $Z_s$ that match the desired solutions of $E_s$ having the desired directivity. In one or more examples, the step comprises plotting the impedance as a function of the frequency of the electromagnetic radiation, using:

$$Z_s = \frac{2\chi}{E_s} - \chi\alpha \tag{2}$$

Block 306 represents selecting the geometry and reactance of the single unit cell that has an acceptable 2D RCS for two extremes of frequencies within the bandwidth of the TCDA. In various examples, the acceptable RCS is determined using variables Zi1 and Zi2 (the imaginary parts of Zs at frequencies f1 and f2, respectively) and by minimizing an impedance tolerance percentage (or selecting the impedance tolerance percentage below a predetermined threshold). In one or more examples, the impedance tolerance percentage is given by:

$$100\times|((zfunc-im(Zs))/zfunc|,$$

where zfunc=Zi1+(f−f1)*(Zi2−Zi1)/(f2−f1).

Figure 3B:
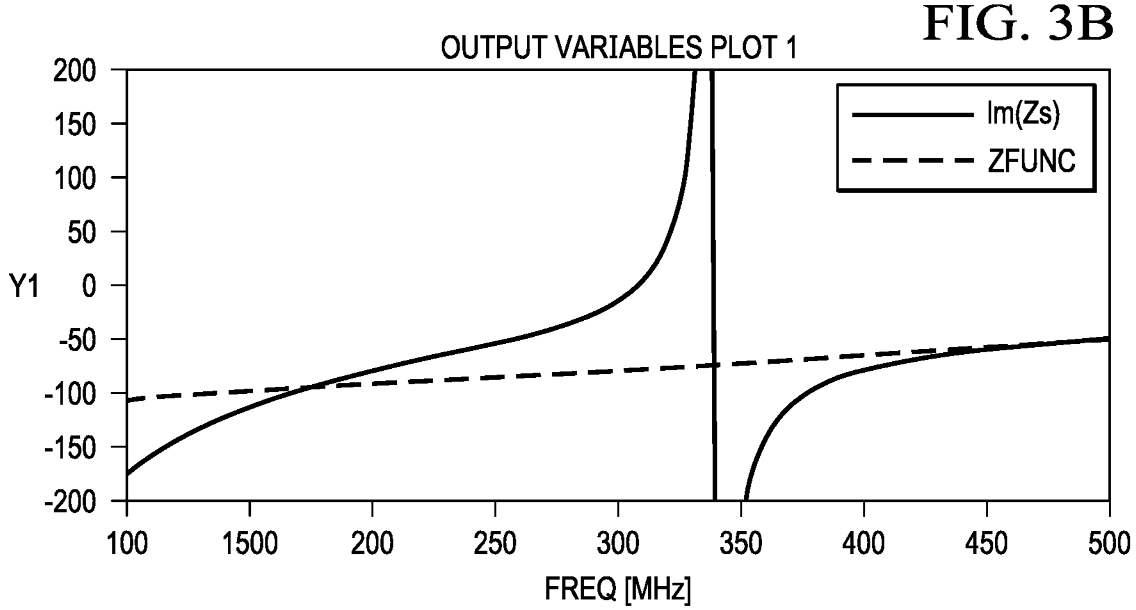
FIG. 3B is a graph plotting example design parameters, surface impedance, $\mathrm{Im}(Z_s)$ and a tolerance function (zfunc), for an example director as a function of the frequency of the electromagnetic radiation.
Figure 3C:
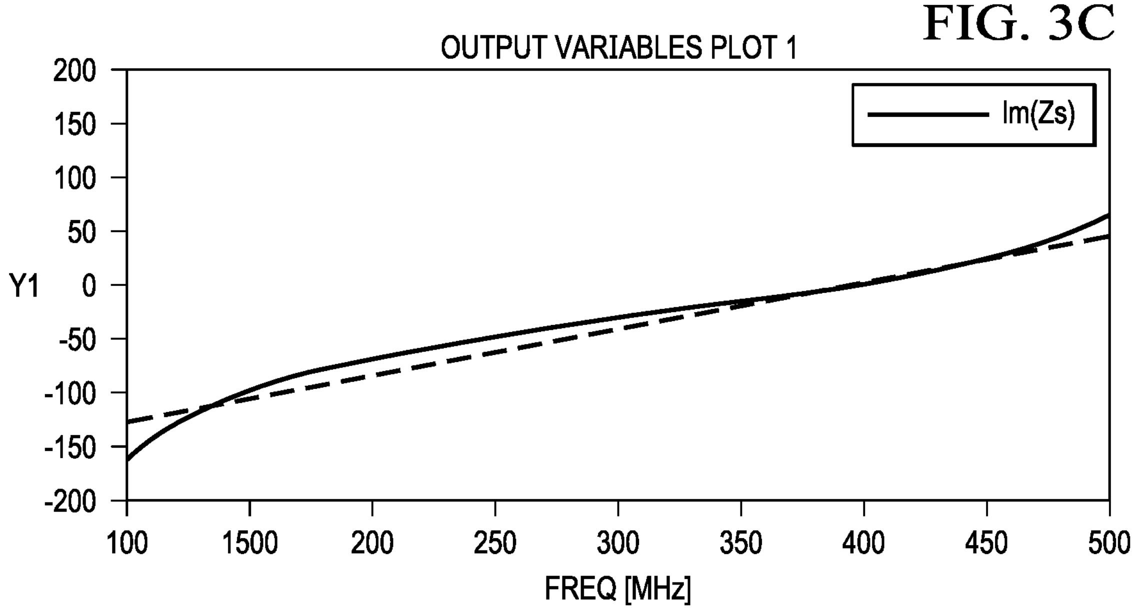
FIG. 3C is a graph plotting example design parameter $\mathrm{Im}(Z_s)$ as a function of frequency for an example reflector.

FIG. 3B plots Im(Zs) and zfunc for the single unit cell of a director 106 and FIG. 3C plots Im(Zs) for the reflector 110, for one example range of frequencies and for the directivity in a narrow cone toward a waterline or horizon. A typical director 106 or reflector 110 includes a plurality of unit cells arranged (e.g., periodically) along a length L2, L3 of the director or reflector, respectively.

Example Director and Reflector Structures

Figure 4A:
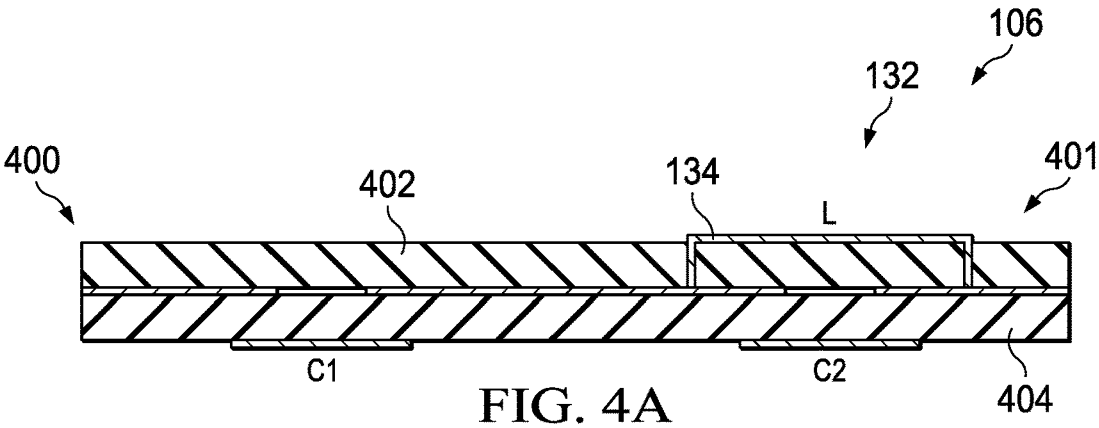
FIG. 4A is a cross-sectional schematic of an example director.
Figure 4B:
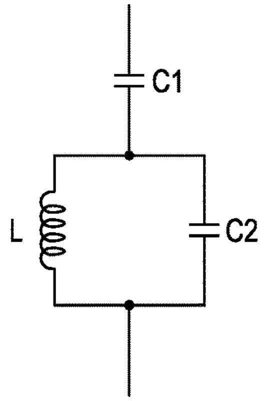
FIG. 4B is an example circuit diagram of the reactive components in an example director.

FIG. 4A illustrates an example unit cell 400 in the second microstrip 132 (comprising the director 106) including the first reactive components implemented as a transmission line or circuit elements 401. The circuit elements 401 comprise reactive loads C1, C2, L including conductive components 134 separated by one or more dielectric layers 402, 404, wherein C1 forms a first capacitive reactance comprising a first conductive pad, C2 forms a second capacitive reactance comprising a second conductive pad, and L comprises an inductive reactance comprising a wire or conductive track. FIG. 4B is a circuit diagram of the unit cell 400, illustrating the second capacitive reactance (capacitor C2) is in parallel with an inductive reactance (inductor L) and the first capacitive reactance (capacitor C1) is in series with the combination of the second capacitive reactance C2 and the inductive reactance L.

Figure 4C:
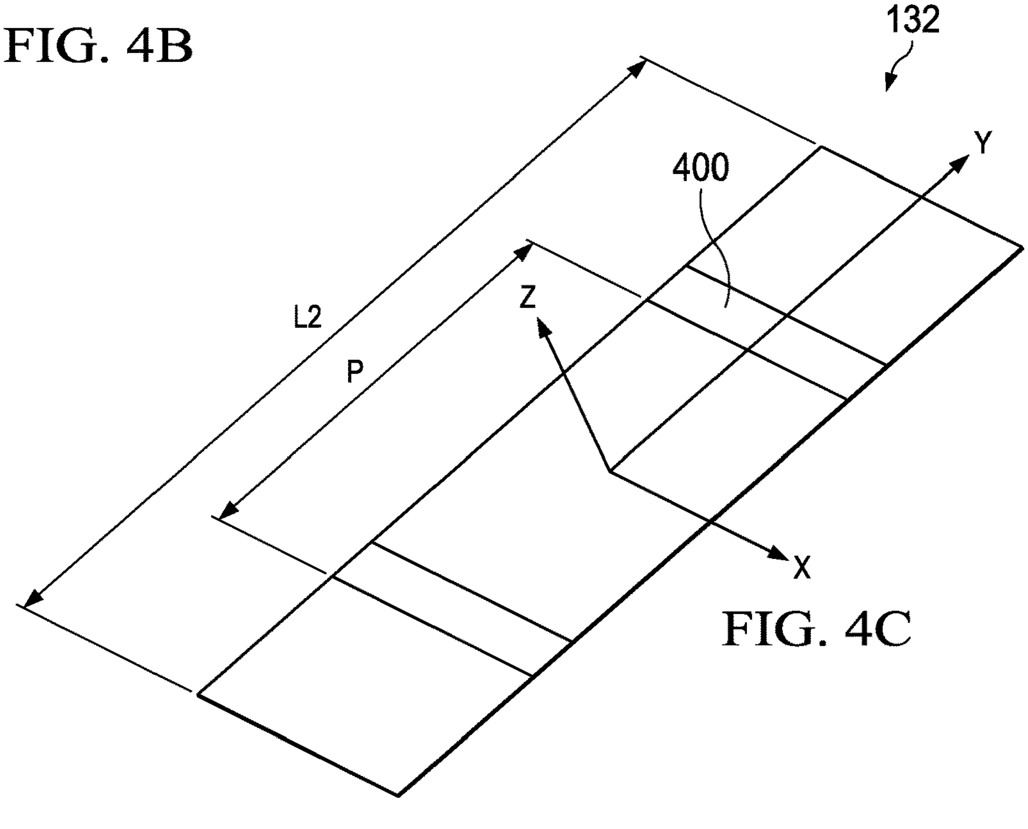
FIG. 4C is a perspective view of an example director showing periodic positioning of the reactive loads in a plurality of unit cells.

FIG. 4C illustrates an example wherein the second microstrip 132 comprises an array of the unit cells 400 positioned along the length L2 of the microstrip with the period P (defined by the spacing d of the conductors 104 in the array 102 or with a positioning commensurate with a positioning of the conductors 104 in the array 102, as illustrated in FIG. 1A or FIG. 2). In one or more examples, each unit cell 400 comprises the circuit elements 401 of FIGS. 4A and 4B.

Figure 5:
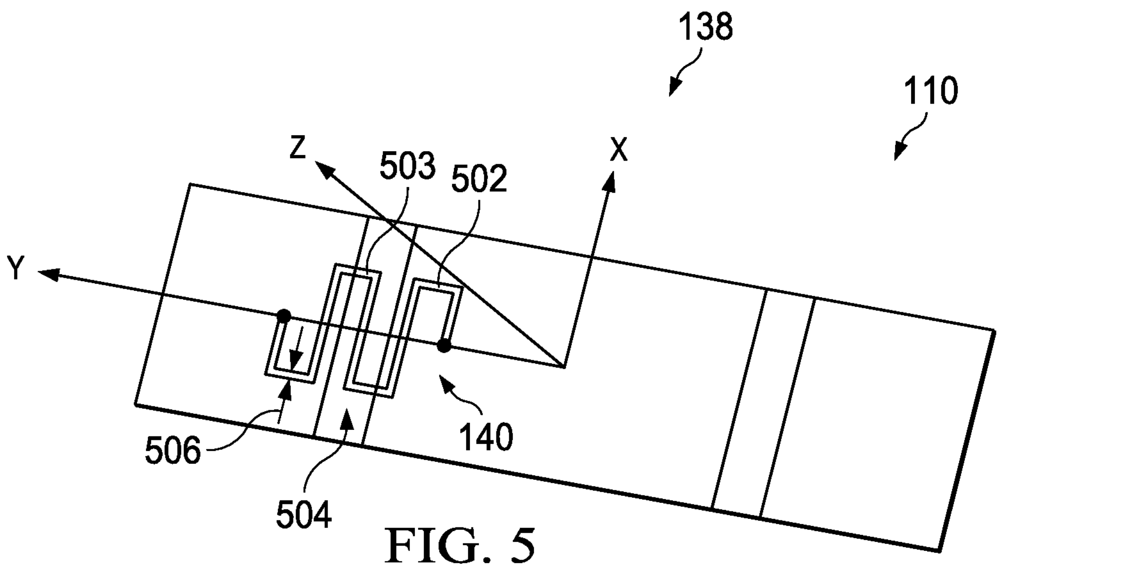
FIG. 5 is a perspective view of an example reflector.

FIG. 5 illustrates an example third microstrip 138 (comprising the reflector 110) wherein the second components 140 comprise a conductive track 502 (e.g., an inductive wire 503) having at least one of a meander 504 or a varying thickness 506 along a length of the reflector 110. Decreasing thickness 506 of the wire increases inductance. Increasing the meander 504 of the wire 503 or conductive track 502 also increases inductance.

Example Antenna Assemblies and Performance

Figure 6A:
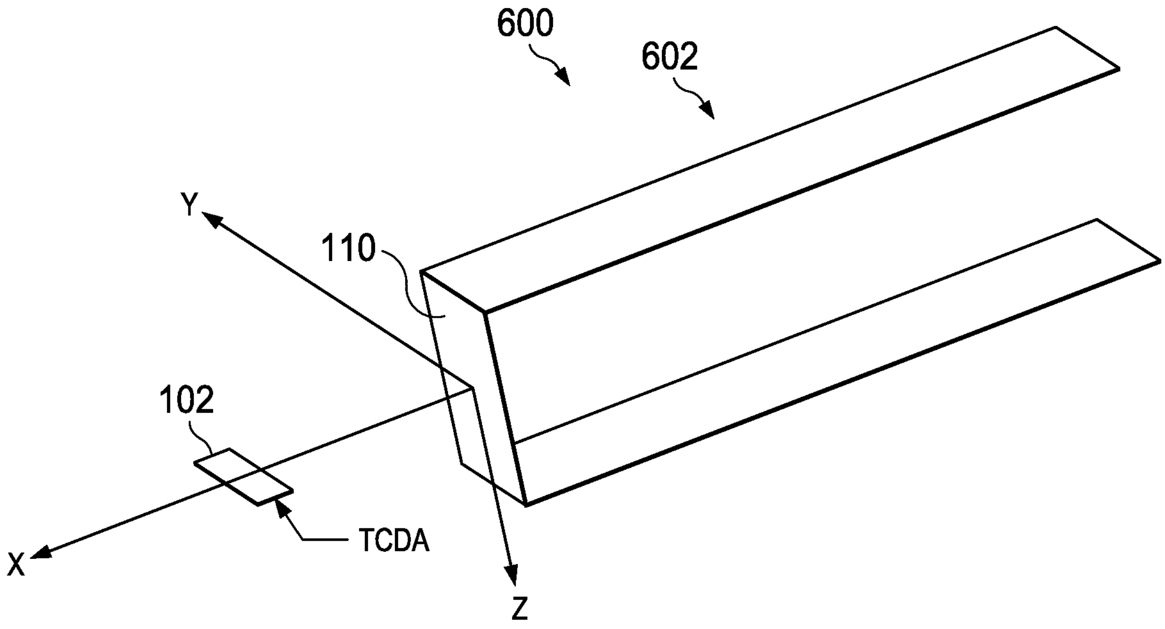
FIG. 6A illustrates an example antenna system coupled to a wing spar, wherein the wing spar comprises a reflector and the antenna system does not include a director.

FIG. 6A illustrates an antenna system 600 comprising an array 102 and a wing spar 602, wherein the wing spar 602 comprises a metal ground plane comprising a reflector 110 or acting as a reflector 110.

Figure 6B:
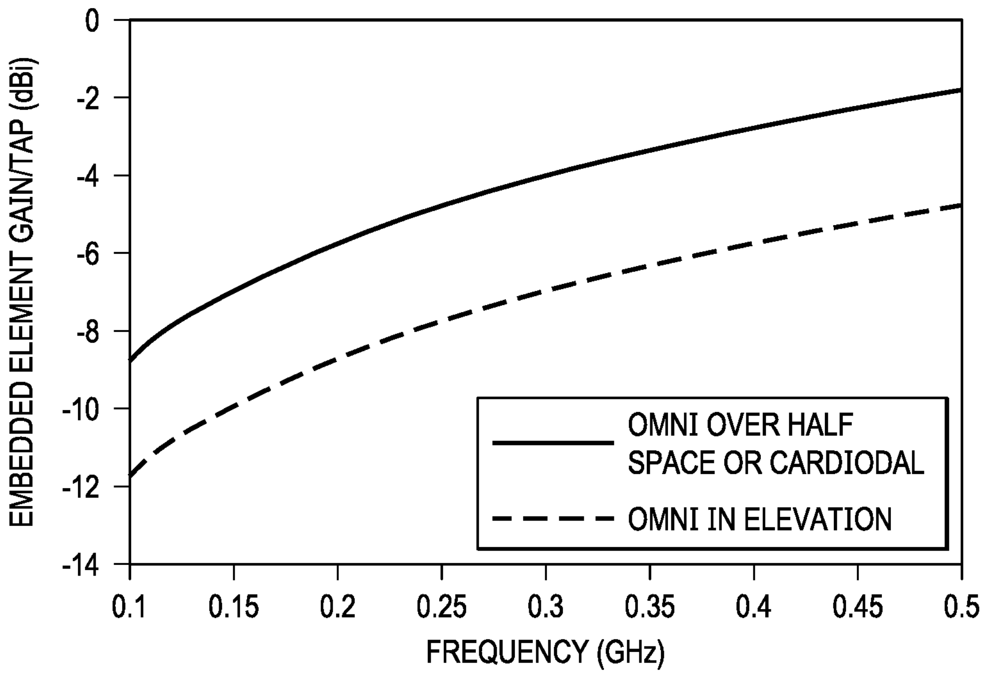
FIG. 6B is a graph plotting the gain of the antenna system of FIG. 6A as compared to the gain without the reflector.

FIG. 6B illustrates the gain of an array 102 (a linear array) without a director 106 and without a reflector 110 (omni in elevation), as well as the gain of the array 102 with a reflector 110 but no director 106 (omni-over half space or cardiodal). The efficiency of the array 102 is given by:

$$\text{Efficiency} = \frac{g_6}{2kp}\int d\theta\Gamma(\theta)$$

where $g_0$ is gain for each fed element in the array 102, $\Gamma(\theta)$ is the normalized elevation pattern, p is the period of the fed elements, and k is the wavenumber $2\lambda/\lambda$ of the electromagnetic radiation. For an omnidirectional radiation pattern, $g_0=2p/\lambda$. As shown in FIG. 6B, the antenna system including the wing spar 602 (but no director 106) has a gain that is 3 dB higher as compared to the directivity without the wing spar 602, assuming the array 102 is 100% efficient (such that all the conductors are matched with no ohmic loss). The wing spar 602 enables the antenna system 600 to be omnidirectional over half space (cardiodal).

Figure 7A:
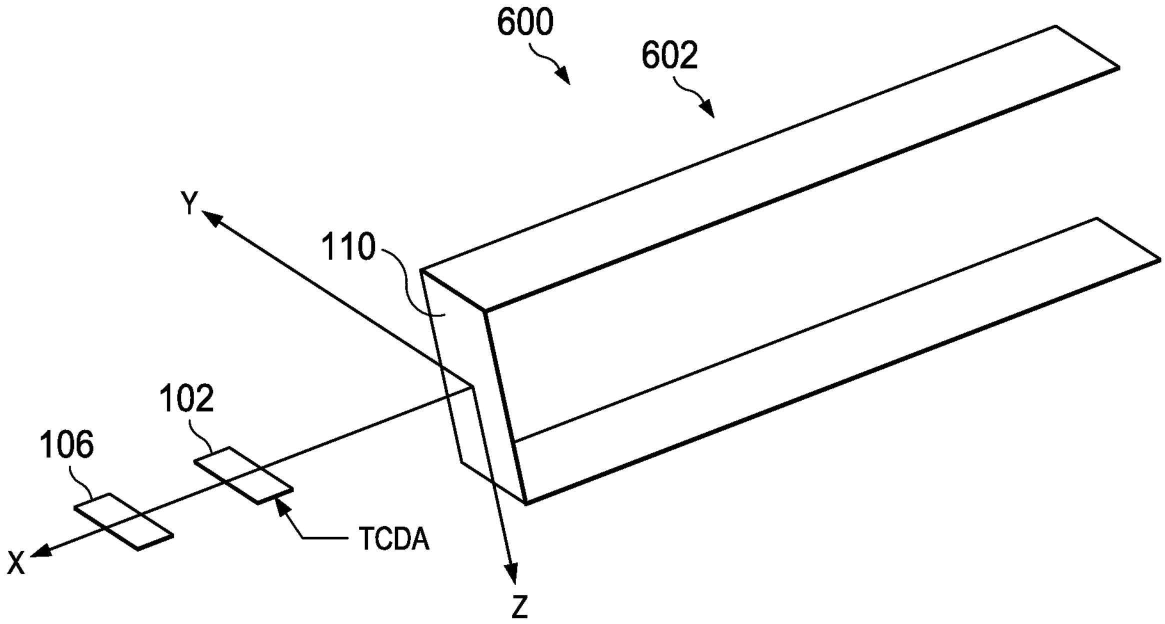
FIG. 7A illustrates an example antenna system coupled to a spar, wherein the antenna system includes a reflector and a director and the spar includes the reflector.
Figure 7B:
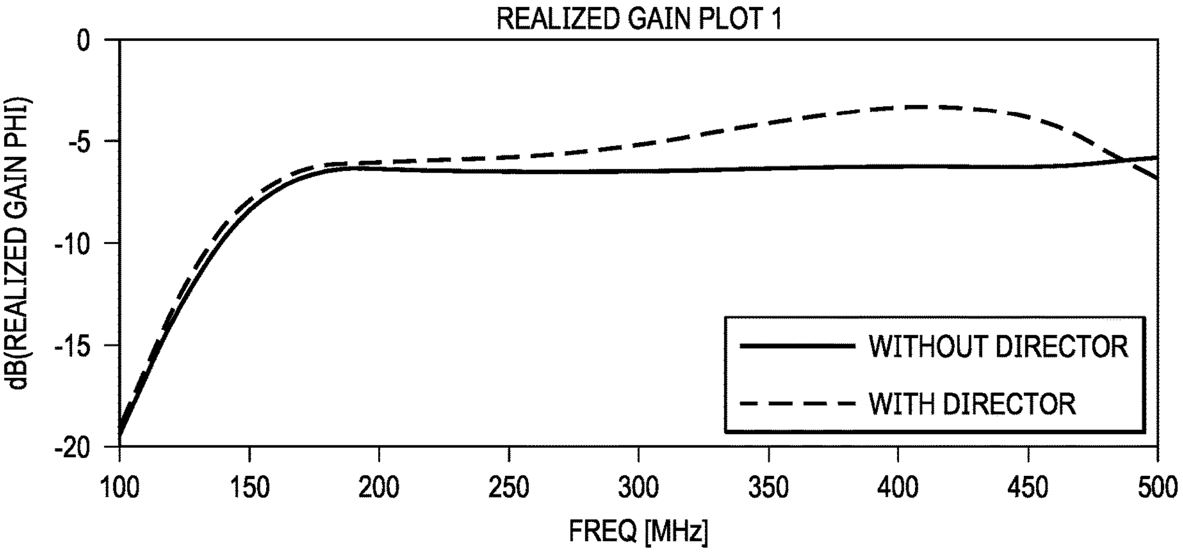
FIG. 7B is a graph plotting gain of the antenna system of FIG. 7A.
Figure 7C:
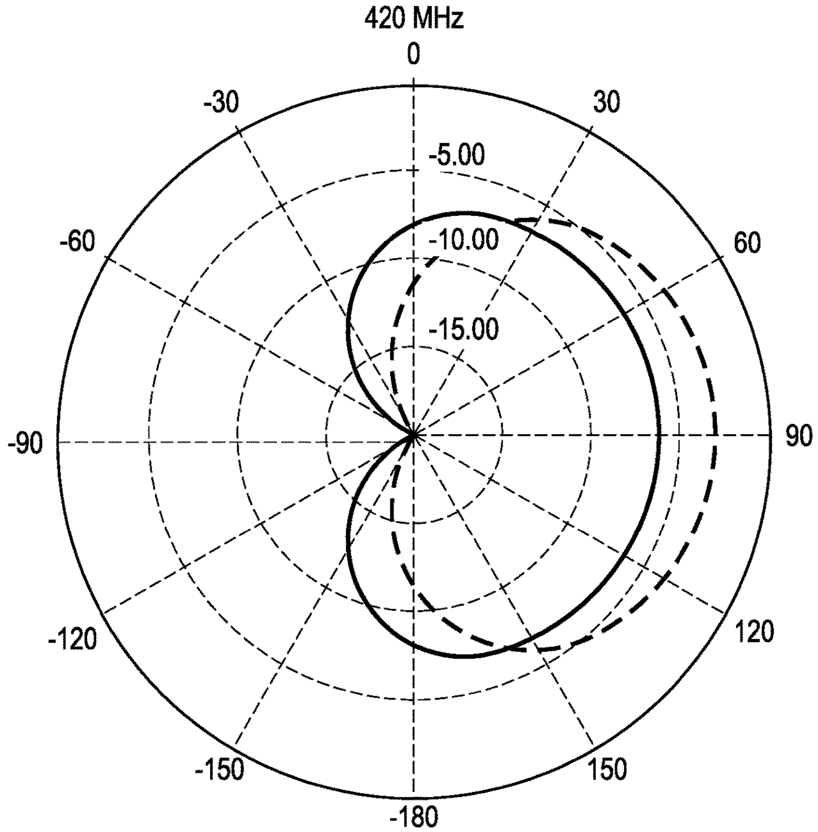
FIG. 7C is a graph plotting directivity of the antenna system of FIG. 7A.
Figure 7D:
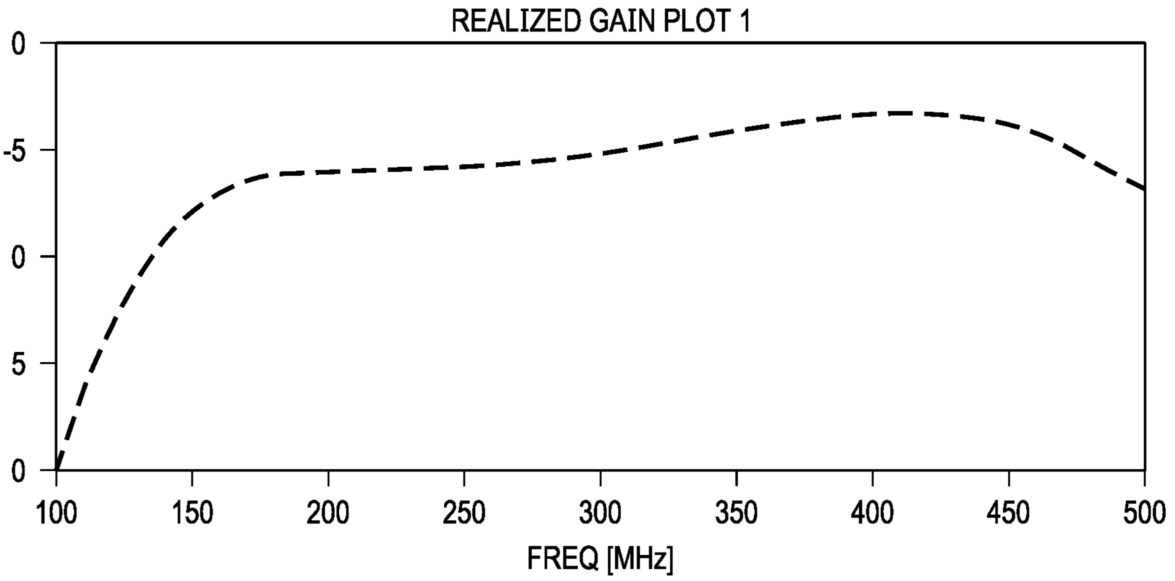
FIG. 7D is a graph plotting gain of the antenna system of FIG. 7A.

FIG. 7A illustrates an antenna system 600 including an array 102 (a linear array), a director 106, and a reflector 110 combined with a wing spar 602 according to another example (dimensions and reactances shown in Table 1). The presence of the director 106 significantly increases the gain and directivity of the antenna system 600, as shown in FIG. 7B and FIG. 7C. FIG. 7D illustrates the gain of the antenna system 600 does not change significantly when the load capacitance (capacitance of the load 116 in FIG. 1A and FIG. 2) is changed from 9.3 pF to 8.87 pF and the capacitive reactance of the director is reduced from 6.7 pF per square to 6.67 pF per square.

Figure 8:
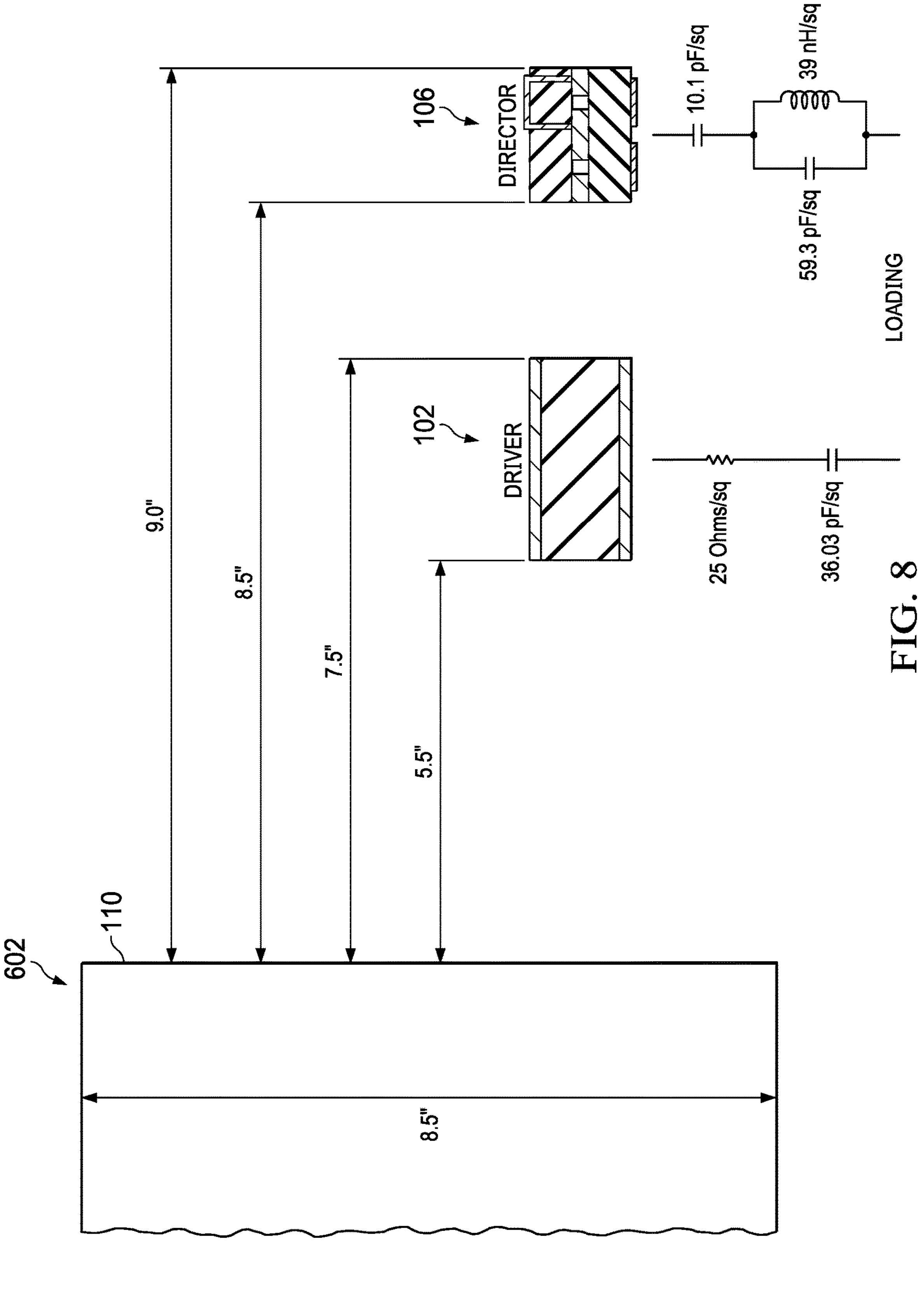
FIG. 8 illustrates an example antenna system comprising microstrips coupled to a spar.

FIG. 8 illustrates another example of the antenna system 600 comprising the array 102 (a linear array), a director 106, and the wing spar 602 comprising the reflector 110, wherein the director 106 comprises the unit cells 400 comprising circuit elements 401 and components 134 illustrated in FIGS. 4A, 4B, and 4C.

TABLE 1

Performance of various antenna configurations

Figure 9:
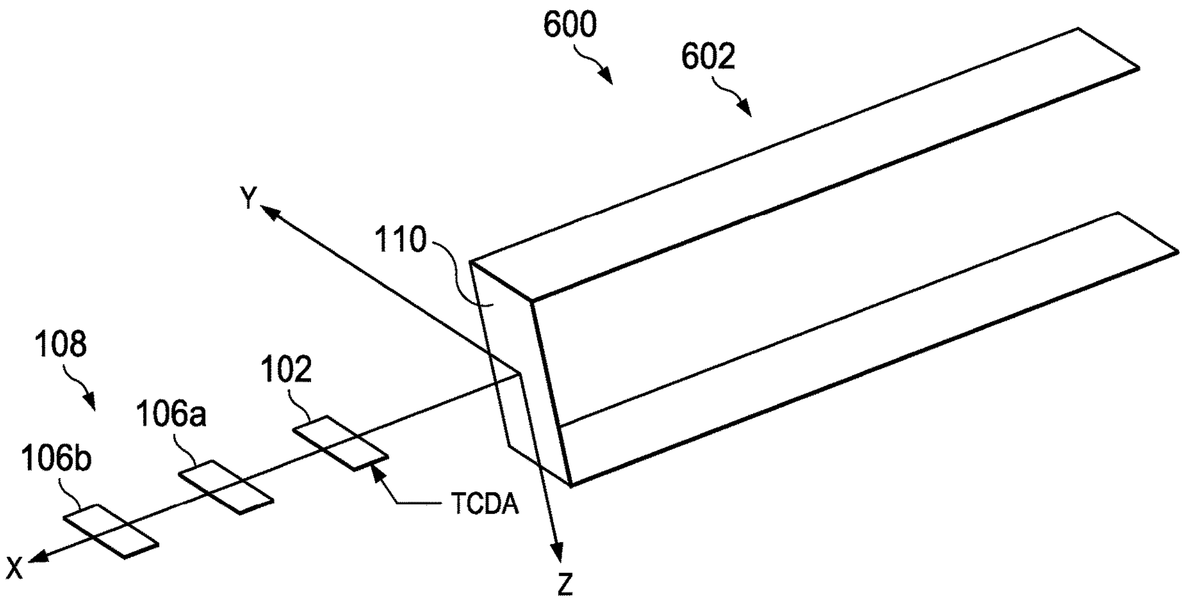
FIG. 9 illustrates an example antenna system comprising two directors and a reflector.
Figure 10A:
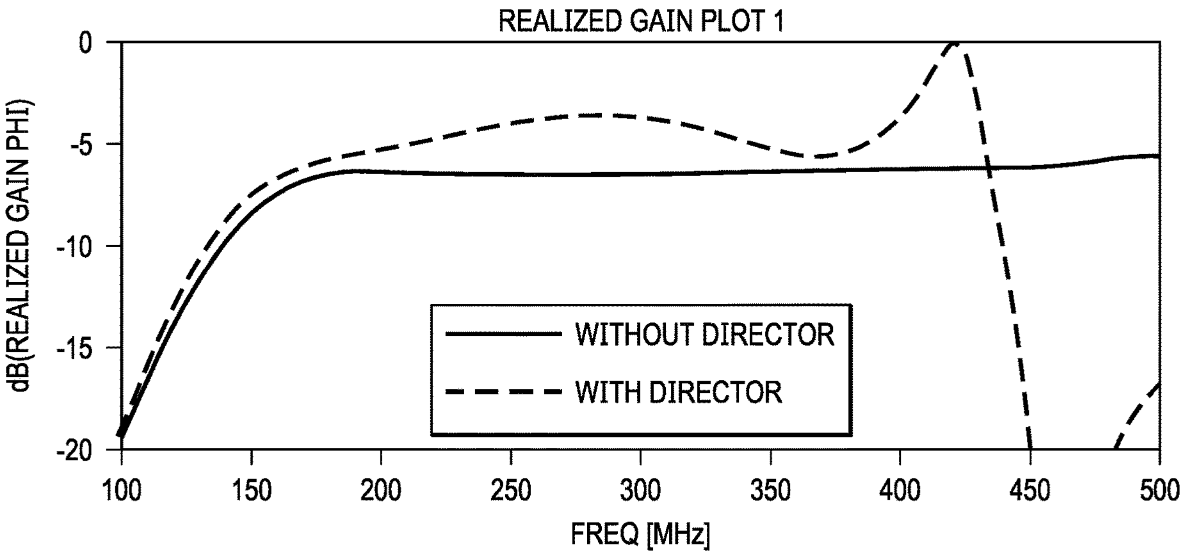
FIG. 10A illustrates the gain of the antenna system of FIG. 9.
Figure 10B:
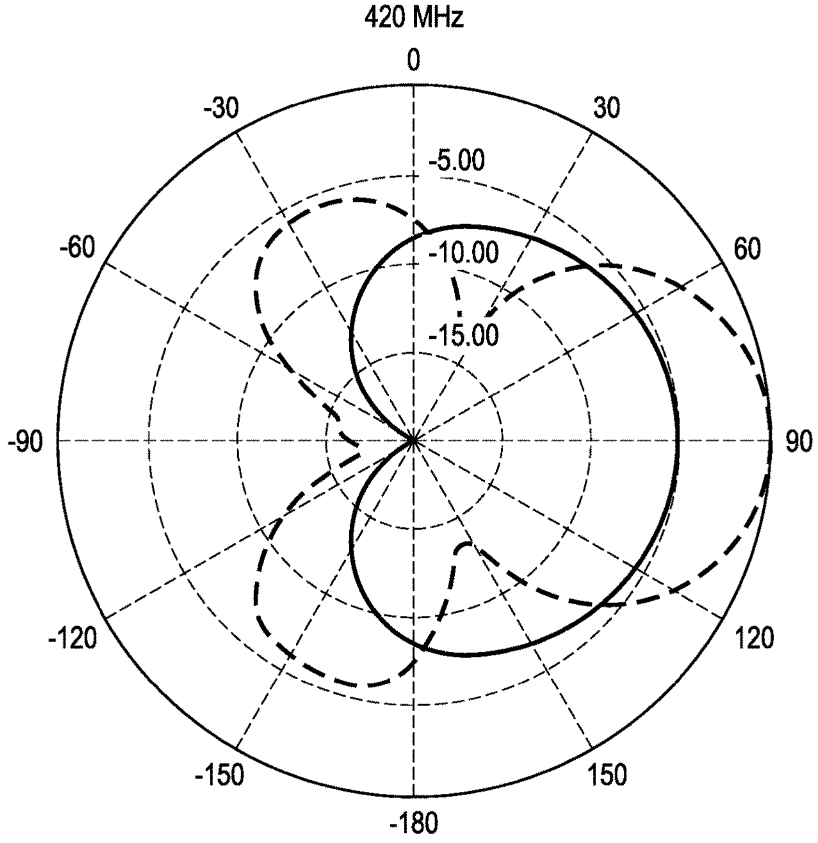
FIG. 10B illustrates the directivity of the antenna system of FIG. 9.

| Configuration | FIG. 7A | FIG. 7A | FIG. 8 | FIG. 9 (two directors) |
|---|---|---|---|---|
| Load Reactance (of load 116 in FIG. 1A or FIG. 2) | 50 ohms in series with 9.3 pF capacitance | 25 Ohm per square in series with a 8.87 pF per square | 25 Ohm per square in series with a 36.03 pF per square | 50 ohms in series with 9.3 pF capacitance |
| Director Reactance | 6.7 pF per square | 6.67 pF per square | FIG. 3A FIG. 3B C1 = 10.1 pF per square C2 = 59.3 pF per square L = comprises 39 nanohenries per square | Both directors 9.78 pF per square |
| Spar to Fed Array 102 distance | 7-8 inches | 7-8 inches | See FIG. 8 | |
| Spar to Director distance | 10.5-11.5 inches | 10.5-11.5 inches | See FIG. 8 | 14 inches from spar to second director |
| Gain | FIG. 7B | FIG. 7D | | FIG. 10A |
| Directivity | FIG. 7C | | | FIG. 10B |

FIG. 9 illustrates an example wherein the antenna system 600 comprises an array 102, multiple directors 106*a*, 106*b* positioned in front (on the first side 108 of) the array 102, and the wing spar 602 comprises the reflector 110. FIG. 10A and FIG. 10B illustrate the gain and directivity of the antenna system of FIG. 9 when the second director 106*b* is 14 inches from the wing spar 602 and the array 102 comprises a linear array, showing both the gain and directivity are increased as compared to an antenna system without directors. In some examples, different directors 106*a*, 106*b* are tailored to increase directivity and gain at different frequencies in the bandwidth of the array 102 (e.g., one director 106*a* tailored for higher gain and directivity at high frequencies and the other director 106*b* tailored for higher gain and directivity at lower frequencies).

Figure 11:
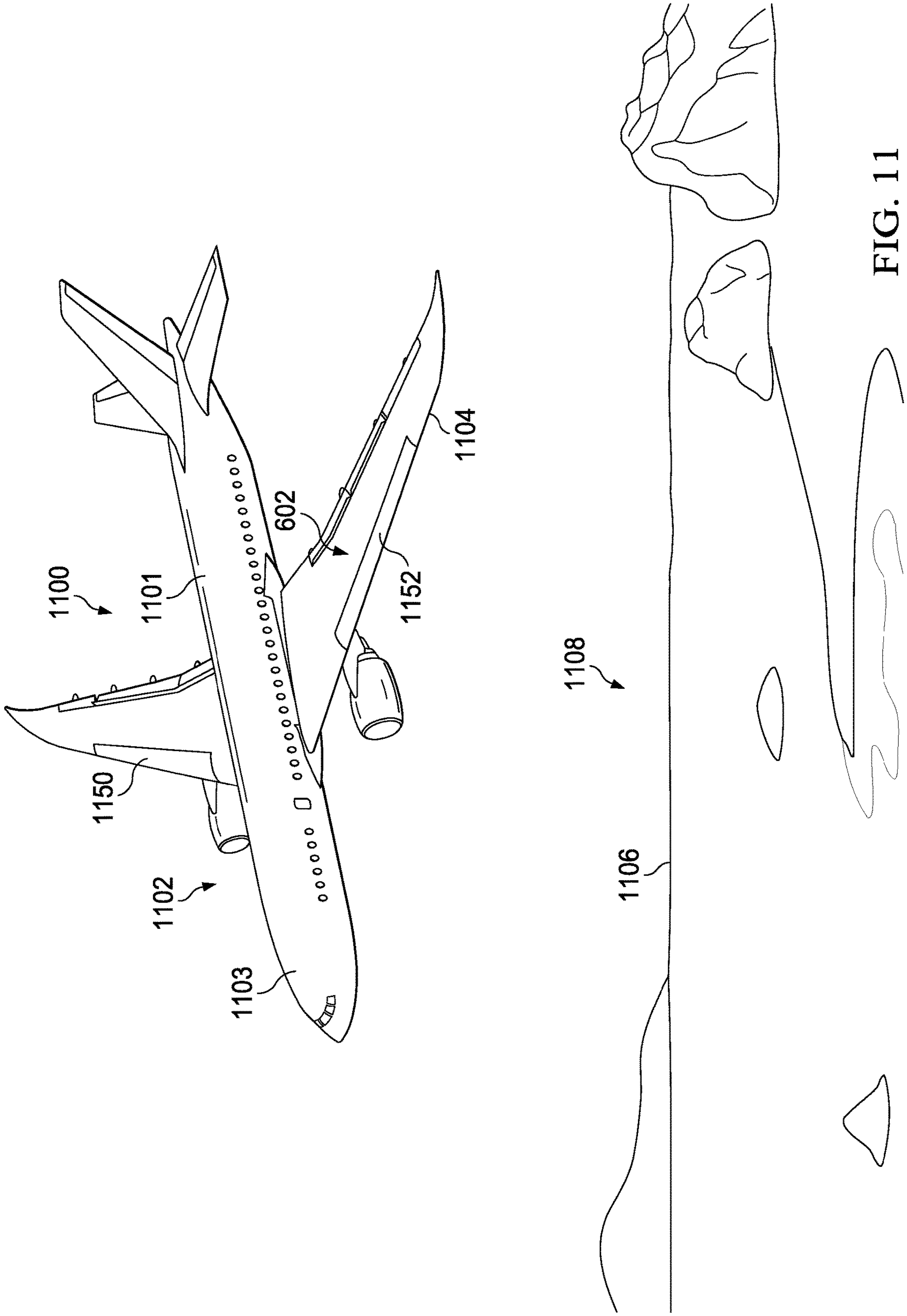
FIG. 11 is a schematic of an aircraft comprising the antenna system of any of the examples described herein.

FIG. 11 illustrates an example aircraft 1100 including a fuselage 1102, a wing 1104, and aircraft structures 1150. Example aircraft structures comprising or coupled to the antenna system include various structural parts of the aircraft 1100, including but not limited to, a bulkhead 1101, an aircraft skin 1103 (e.g., skin panel), a wing spar 602, or a leading edge 1152 of the wing 1104. One or more components of the antenna system (e.g., the reflector 110) are integrated or combined with the aircraft structure in various configurations. In some examples, the antenna system 100 is entirely mounted on a surface of the aircraft structure 1150, and in other examples the antenna system 100 is mounted within an interior of the aircraft structure. FIG. 11 further illustrates the antenna system is configurable and positioned so that the desired directivity is toward a waterline 1106 or horizon 1108.

Example Process Steps

Method of Making an Antenna System

Figure 12:
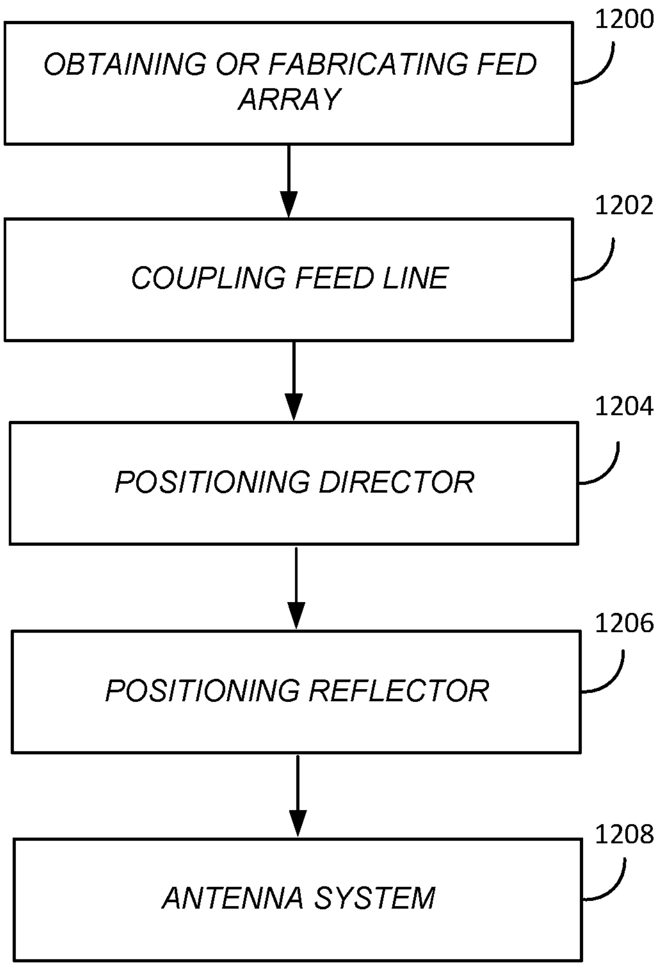
FIG. 12 is a flowchart illustrating an example method of making an antenna system.

FIG. 12 illustrates a method of making an antenna system, comprising the following steps.

Block 1200 represents obtaining or fabricating an array of elements (e.g., a multi-tap antenna, a TCDA, a linear array, or a fed array). In one or more examples, the elements comprise conductors. Example conductors include a metal layer on a dielectric. In one or more further examples, the elements each comprise dipole elements.

Block 1202 represents coupling a feed line to the array. The array is configured to:

- emit radiation in response to an input signal being input to the dipole elements through the feed line; or
- output an output signal to the feed line in response to electromagnetic radiation being received on the multi-tap antenna.

Block 1204 represents positioning a director in front of the array, wherein the director has a reactance that increases a directivity of the antenna system. In one or more examples, the director comprises a printed circuit board or circuitry comprising metal pads or tracks combined with dielectric to form a first reactive load.

Block 1206 represents positioning a reflector behind the array, wherein the reflector is configured to cause reflection of the radiation toward the director or the array. In one or more examples, the reflector comprises a printed circuit board or circuitry comprising metal pads or tracks combined with dielectric to form a second reactive load.

Block 1208 represents the end result, an antenna system. Illustrative, non-exclusive examples of inventive subject matter according to the present disclosure are described in the following enumerated paragraphs (referring also to FIG. 1A, FIG. 1B, FIG. 2, FIGS. 4A-4C, FIG. 5, and FIGS. 6A, FIG. 8, FIG. 9, and FIG. 11):

A1. An antenna system (100), comprising:

- an array (102) of conductors (104) coupled to a feed line (202), wherein the array (102) is configured to:
  - emit electromagnetic radiation (113) in response to an input signal being input to the array (102) through the feed line (202); or
  - output an output signal to the feed line (202) in response to electromagnetic radiation (113) being received on the array (102); and
- a director (106) disposed in front of the array (102), wherein the director (106) has a first reactive load (135) having a first complex impedance that is tailored to increase a directivity (144) of the antenna system (100) by reactively loading the conductors (104).

A2. The antenna system (100) of paragraph A1, further comprising a reflector (110) disposed behind the array (102), wherein the reflector (110) is configured to cause a reflection (119) of a portion of the electromagnetic radiation (113), received on the reflector 110 and comprising received electromagnetic radiation, toward the director (106).

A3. The antenna system (100) of paragraph A2, wherein:

- the reflector (110) comprises a second reactive load (141); and
- the second reactive load (141) has a second complex impedance that tailors the reflection of the received electromagnetic radiation (113) toward the director (106).

A4 The antenna system (100) of paragraph A3, wherein:

- the reflector (110) comprises a printed circuit board (124);
- the printed circuit board (124) comprises a conductive track (502); and
- the conductive track (502) comprises at least one of a thickness (506) or meander (504) varying as a function of position along a length (L3) of the reflector (110) so as to tailor the second complex impedance.

A5. The antenna system (100) of any of the paragraphs A1-A4, wherein:

- the director (106) comprises a printed circuit board (124);
- the printed circuit board (124) comprises circuitry; and
- the circuitry has one or more reactive impedances that form the first reactive load (135).

A6. The antenna system (100) of paragraph A5, wherein:

- the circuitry comprises circuit elements (401) configured to control a phase of the electromagnetic radiation (113) at different positions along a length (L1) of the array (102) so as to increase the directivity (144) by tailoring at least one of a destructive interference or constructive interference of the electromagnetic radiation (113) at the different positions.

A7. The antenna system (100) paragraph A5 or A6, wherein the one or more reactive impedances comprise a capacitive reactance and an inductive reactance.

A8. The antenna system (100) of any of the paragraphs A1-A7, wherein the first reactive load (135) comprises an array of circuit elements (401), and wherein each of the circuit elements (401) comprises:

- a first capacitor (C1); and
- a second capacitor (C2) in parallel with an inductor (L);
- wherein the first capacitor (C1) is in series with the combination of the second capacitor (C2) and the inductor (L).

A9. The antenna system (100) of any of the paragraphs A1-A8, wherein:

- the conductors (104) are periodically positioned along the array (102) with a period P; and
- the first reactive load (135) comprises the array of circuit elements (401) positioned along a length (L2) of the director (106) with the period P.

A10. The antenna system (100) of any of the paragraphs A1-A9, further comprising:

- a first microstrip (126) comprising the array, wherein the first microstrip (126) further includes:
  - the conductors (104);
  - a conductive backplane (128);
  - a first dielectric (130) disposed between the conductors (104) and the conductive backplane (128); and
  - a plurality of loads (116), wherein each of the loads (116) connects one of the conductors (104*a*) to an adjacent one of the conductors (104*b*); and
- a second microstrip (132) comprising the director (106), wherein:

the second microstrip (132) further comprises the first reactive load (135);

the first reactive load (135) comprises a plurality of conductive components (134) separated by one or more dielectric layers (402, 404); and the plurality of conductive components (134) comprise at least one of a capacitive pad or a wire having an inductance.

A11. The antenna system (100) of paragraph A10, further comprising:

a third microstrip (138) comprising the reflector (110) positioned behind the array (102), wherein the third microstrip (138) comprises a second reactive load (141) including a wire having at least one of a varying thickness (506) or a meander (504) varying an inductance of the wire along a length (L3) of the third microstrip (138).

A12. The antenna system (100) of paragraphs A10 or A11, wherein two or more of the first microstrip (126), the second microstrip (132), and the third microstrip (138) are parallel, coplanar, and have the same length.

A13. The antenna system (100) of any of the paragraphs A1-A12, wherein:

a distance (D1) between the array (102) and the director (106) is within 10% of λ/4;

a distance (D2) between the array (102) and the reflector (110) is within 10% of λ/8; and λ is the longest wavelength of the electromagnetic radiation (113).

A14. The antenna system (100) of any of the paragraphs A1-1A13, wherein at least one of the first reactive load (135) or the second reactive load (141) are tailored as a function of:

a frequency of the electromagnetic radiation (113) in range between 10 MHz and 10 GHz; and the directivity (144) of the antenna system (100).

A15. The antenna system (100) of any of the paragraphs A1-A14, wherein the directivity (144) comprises the electromagnetic radiation (113) converging to or from a sidewall (114) (e.g., edge) of the array (102) facing the director (106).

A16. The antenna system (100) of any of the paragraphs A1-A15, wherein the director (106) is configured so that the directivity (144) comprises the electromagnetic radiation (113) focused in an elevation direction from or to a horizon (1108).

A17. The antenna system (100) of any of the paragraphs A1-A16, wherein the array (102) comprises a tightly coupled dipole array (TCDA) or a multi-tap antenna (200).

A18. The antenna system (100) of any of the paragraphs A1-A17, wherein:

the conductors (104) each have a length (L4) within 10% of λ/10;

the conductors (104) are separated by a distance (d) within 10% of λ/100; and λ is the longest wavelength of the electromagnetic radiation (113).

A19. The antenna system (100) of any of the paragraphs A1-A18, wherein:

the conductors (104) are capacitively coupled or coupled by a near field interaction of an electric field, so that the electric field generated by the electromagnetic radiation (113) at one of the conductors (104*a*) and experienced at a next adjacent one of the conductors (1041)) has:

a near-field amplitude proportional to $1/d^2$; and a reactive near field amplitude proportional to $1/d^3$, where d is a distance separating the one of the conductors (104-*a*) from the next adjacent one of the conductors (104*b*).

A20. The antenna system (100) of any of the paragraphs A1-A19, further comprising an aircraft structure (1150), wherein:

the aircraft structure (1150) comprises or is attached to the reflector (110); and the aircraft structure (1150) further comprises a skin (1103), a wing spar (602), a bulkhead (1101), or a leading edge of a wing.

A21. An aircraft (1100) comprising the antenna system (100) of paragraph 1.

A22. The antenna system (100) of any of the paragraphs A1-A21, wherein the director (106) and the reflector (110) comprise passive elements.

A23. The antenna system (100) of any of the paragraphs A1-A16, wherein the electromagnetic radiation (113) comprises radio frequencies.

A24. A transmitter comprising the antenna system of any of the paragraphs A1-A18, wherein the directivity (144) focuses energy of the electromagnetic radiation to a sensor at a waterline or horizon.

A25. The antenna system (100) of any of the paragraphs A1-A24, wherein the array (102), the director (106), and the reflector (110) are reactively loaded over a conductive backplane (128) to provide an improvement of up to 6 Decibels in gain.

A26. The antenna system (100) of any of the paragraphs A1-A25, wherein the array (102), the director (106), and the reflector (110) are reactively loaded so that when an active center dipole element comprising one of the conductors (104) in the array (102) is excited, other dipole elements (comprising other conductors (104) are also excited, but in a given phase in which they excitation fields of the dipole element add in the direction of the horizon and cancel above and below the array (up and down).

A27. The antenna system (100) of any of the paragraphs A1-A26, wherein the directivity (144) is increased in the elevation direction (angle theta) but not significantly increased in the azimuth direction, so that the electric field pattern comprises an cone having elliptical cross section comprising a long axis along the elevation direction and a short axis along the azimuth direction.

A28. The antenna system (100) of any of the paragraphs A1-A27, wherein the array (102) comprises a linear array of the conductors (104).

A29. The antenna system (100) of any of the paragraphs A1-A28, wherein the conductors (104) comprise dipole elements.

A30. The antenna system (100) of any of the paragraphs A1-A29, wherein the array (102) comprises a fed array.

A31. The antenna system (100) of any of the paragraphs A1-A29, wherein the array (102) comprises a TCDA.

A32. The antenna system (100) of any of the paragraphs A1-A29, wherein the array (102) comprises a plurality of loads (116) and each of the loads (116) connects one of the conductors (104*a*) to an adjacent one of the conductors (104*b*).

A33. The antenna system (100) of paragraph A32, wherein each of the loads (116) comprises a resistance or a resistance in series with a capacitance.

A34. The antenna system (100) of any of the paragraphs A1-A33, wherein the first reactive load (135) comprises a capacitive strip (120) comprising a first metal layer on a first dielectric.

A35. The antenna system (100) of any of the paragraphs A3-A34, wherein the second reactive load (141) comprises an inductive strip (122) comprising a second metal layer on a second dielectric.

A36. The antenna system (100) of any of the paragraphs A1-A35, wherein the first reactive load (135) comprises at least one capacitor (C1) including a dielectric layer 404.

A37. The antenna system (100) of any of the paragraphs A1-A36, wherein at least one of the first reactive load (135) or the second reactive load (141) comprises circuitry on a dielectric layer (404) and/or a semiconductor.

A38. The antenna system (100) of paragraph A37, wherein the circuitry comprises one or more discrete electrical components, one or more circuit elements 401, one or more conductive tracks (502), or one or more conductive pads.

A39. A method of making an antenna system, the method comprising:

- obtaining a multi-tap antenna comprising an array of conductors and a plurality of loads coupling the array of conductors;
- coupling a feed line to the array of conductors so that the multi-tap antenna is configured to:
  - emit electromagnetic radiation in response to an input signal being input to the multi-tap antenna through the feed line; or
  - output an output signal to the feed line in response to electromagnetic radiation being received on the multi-tap antenna;
- positioning a director in front of the multi-tap antenna, wherein the director has a director reactance that increases a directivity of the antenna system; and
- positioning a reflector behind the multi-tap antenna, wherein the reflector has a reflector reactance that causes reflection of the radiation toward the director.

A40. The method of paragraph A39, further comprising:

- varying the reflector reactance as a function of position along a length of the reflector; and
- varying the director reactance along a length of the director, thereby controlling a phase of the electromagnetic radiation at different positions along the length of the director so that at least one of a destructive interference or constructive interference of the electromagnetic radiation is tailored at the different positions.

Method of Using an Antenna Array

Figure 13:
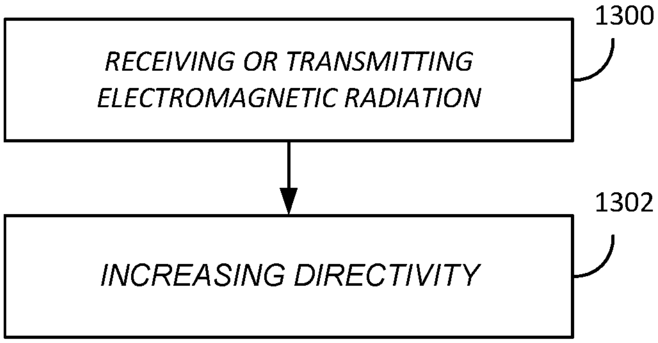
FIG. 13 is a flowchart illustrating an example method of using an antenna system.

FIG. 13 illustrates a method of using an antenna system.

Block 1300 represents receiving or transmitting radiation using an antenna array (e.g., a TCDA).

Block 1302 represents increasing a directivity of the antenna system using a director positioned in front of the array and a reflector positioned behind the antenna array. In one or more examples, the directivity is toward a horizon or waterline.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An antenna system, comprising:

- a first microstrip comprising,
- an array of conductors,
- a plurality of loads, wherein each of the loads connects one of the conductors to an adjacent one of the conductors;
- a conductive backplane, and
- a dielectric disposed between the conductors and the conductive backplane,
- wherein the array is coupled to a feed line and is configured to:
  - emit electromagnetic radiation in response to an input signal being input to the array through the feed line; or
  - output an output signal to the feed line in response to electromagnetic radiation being received on the array; and
- a second microstrip comprising a director disposed in front of the array, wherein,
- the director has a first reactive load having a first complex impedance that is tailored to increase a directivity of the antenna system by reactively loading the conductors,
- the first reactive load comprises a plurality of conductive components separated by one or more dielectric layers; and
- the plurality of conductive components comprise at least one of a capacitive pad or a wire having an inductance.

2. The antenna system of claim 1, further comprising a third microstrip comprising a reflector disposed behind the array, wherein the reflector is configured to cause a reflection of a portion of the electromagnetic radiation, received on the reflector and comprising received electromagnetic radiation, toward the director.

3. The antenna system of claim 2, wherein:

- the reflector comprises a second reactive load; and
- the second reactive load has a second complex impedance that tailors the reflection of the received electromagnetic radiation toward the director.

4. The antenna system of claim 3, further comprising a printed circuit board comprising the first microstrip, the second microstrip, and the third microstrip, wherein:

- the third microstrip further comprises a conductive track; and
- the conductive track comprises at least one of a thickness or meander varying as a function of position along a length of the reflector so as to tailor the second complex impedance.

5. The antenna system of claim 1, further comprising a printed circuit board comprising the first microstrip and the second microstrip, wherein:

- the second microstrip comprises circuitry; and
- the circuitry has one or more reactive impedances that form the first reactive load, wherein the first reactive load comprises the plurality of conductive components separated by the one or more dielectric layers of the printed circuit board.

6. The antenna system of claim 5, wherein:

- the circuitry comprises circuit elements configured to control a phase of the electromagnetic radiation at different positions along a length of the array so as to increase the directivity by tailoring at least one of a destructive interference or constructive interference of the electromagnetic radiation at the different positions.

7. The antenna system claim 5, wherein the one or more reactive impedances comprise a capacitive reactance and an inductive reactance.

8. The antenna system of claim 1, wherein the first reactive load comprises an array of circuit elements, and wherein each of the circuit elements comprises:

a first capacitor; and a second capacitor in parallel with an inductor;

wherein the first capacitor is in series with the combination of the second capacitor and the inductor.

9. The antenna system of claim 8, wherein:

the conductors are periodically positioned along the array with a period P; and the first reactive load comprises the array of circuit elements positioned along a length of the director with the period P.

10. The antenna system of claim 1, further comprising:

a third microstrip comprising a reflector positioned behind the array, wherein the third microstrip comprises a second reactive load including a wire having at least one of a varying thickness or a meander varying an inductance of the wire along a length of the third microstrip.

11. The antenna system of claim 10, wherein:

the array is a linear array; and the first microstrip, the second microstrip, and the third microstrip are parallel, coplanar, and have the same length.

12. The antenna system of claim 11, wherein:

a distance between the array and the director is within 10% of $\lambda/4$;

a distance between the array and the reflector is within 10% of $\lambda/8$; and $\lambda$ is the longest wavelength of the electromagnetic radiation.

13. The antenna system of claim 11, wherein the first reactive load and the second reactive load are tailored as a function of:

a frequency of the electromagnetic radiation in range between 10 MHz and 10 GHz; and the directivity of the antenna system.

14. The antenna system of claim 1, wherein the directivity comprises the electromagnetic radiation converging to or from a sidewall of the array facing the director.

15. The antenna system claim 1, wherein the director is configured so that the directivity comprises the electromagnetic radiation focused in an elevation direction from or to a horizon.

16. The antenna system of claim 1, wherein the array comprises a tightly coupled dipole array (TCDA) or a multi-tap antenna.

17. The antenna system of claim 16, wherein:

the conductors each have a length within 10% of $\lambda/10$;

the conductors are separated by a distance within 10% of $\lambda/100$; and $\lambda$ is the longest wavelength of the electromagnetic radiation.

18. The antenna system of claim 1, wherein:

the conductors are capacitively coupled or coupled by a near field interaction of an electric field, so that the electric field generated by the electromagnetic radiation at one of the conductors and experienced at a next adjacent one of the conductors has:

a near-field amplitude proportional to $1/d^2$; and a reactive near field amplitude proportional to $1/d^3$, where d is a distance separating the one of the conductors from the next adjacent one of the conductors.

19. The antenna system of claim 1, further comprising an aircraft structure, wherein:

the aircraft structure comprises or is attached to a reflector disposed behind the array;

the reflector is configured to cause a reflection of a portion of the electromagnetic radiation, received on the reflector and comprising received electromagnetic radiation, toward the director; and the aircraft structure further comprises a skin, a wing spar, a bulkhead, or a leading edge of a wing.

20. A method of making an antenna system, comprising:

providing a first microstrip comprising:

an array of conductors, a plurality of loads, wherein each of the loads connects one of the conductors to an adjacent one of the conductors;

a conductive backplane, and a dielectric disposed between the conductors and the conductive backplane, coupling the array to a feed line configured to:

emit electromagnetic radiation in response to an input signal being input to the array through the feed line; or output an output signal to the feed line in response to electromagnetic radiation being received on the array; and disposing a second microstrip comprising a director in front of the array, wherein:

the director has a first reactive load having a first complex impedance that is tailored to increase a directivity of the antenna system by reactively loading the conductors;

the first reactive load comprises a plurality of conductive components separated by one or more dielectric layers; and the plurality of conductive components comprise at least one of a capacitive pad or a wire having an inductance.

* * * * *